United States Patent
Zhang et al.

(10) Patent No.: US 9,559,611 B2
(45) Date of Patent: Jan. 31, 2017

(54) MULTILEVEL POWER CONVERTER SYSTEM AND METHOD

(71) Applicant: General Electric Company, Schenectady, NY (US)

(72) Inventors: Di Zhang, Albany, NY (US); Luis Jose Garces, Niskayuna, NY (US); Rajib Datta, Niskayuna, NY (US); Ravisekhar Nadimpalli Raju, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 958 days.

(21) Appl. No.: 13/629,882

(22) Filed: Sep. 28, 2012

(65) Prior Publication Data

US 2014/0092661 A1    Apr. 3, 2014

(51) Int. Cl.
*H02M 7/515* (2007.01)
*H02M 7/487* (2007.01)
*H02M 3/337* (2006.01)
*H02M 7/537* (2006.01)
*H02M 7/5387* (2007.01)
(Continued)

(52) U.S. Cl.
CPC .......... *H02M 7/5152* (2013.01); *H02M 7/487* (2013.01); *H02M 3/3376* (2013.01); *H02M 7/537* (2013.01); *H02M 7/53871* (2013.01); *H02M 7/7575* (2013.01); *H02M 2007/4835* (2013.01); *Y02E 60/60* (2013.01)

(58) Field of Classification Search
CPC  H02M 3/3376; H02M 7/537; H02M 7/53871; H02M 7/5152; H02M 7/487; H02M 7/7575; H02M 2007/4835

USPC ...................... 363/17, 98, 131, 132
See application file for complete search history.

(56) References Cited

U.S. PATENT DOCUMENTS 5,644,483 A * 7/1997 Peng ............... H02M 7/487
                                                    363/132
5,684,688 A   11/1997 Rouaud et al.
(Continued)

FOREIGN PATENT DOCUMENTS

DE          10103031 A1    7/2002
EP           2713495 A2    4/2014
(Continued)

OTHER PUBLICATIONS

A. Leisnicar et al.; An Innovative Modular Multilevel Converter Topology Suitable for a Wide Power Range; IEEE Bologna Power Tech Conference; Jun. 23-26, 2003; 6 Pages; Bologna, Italy.
(Continued)

*Primary Examiner* — Jue Zhang
*Assistant Examiner* — Lakaisha Jackson
(74) *Attorney, Agent, or Firm* — Seema S. Katragadda

(57) ABSTRACT

A power converter is presented. The power converter includes at least one leg, the at least one leg includes a first string, where the first string includes a plurality of controllable semiconductor switches, a first connecting node, and a second connecting node, and where the first string is operatively coupled across a first bus and a second bus. Furthermore, the at least one leg includes a second string operatively coupled to the first string via the first connecting node and the second connecting node, where the second string includes a plurality of switching units. A method for power conversion is also presented.

21 Claims, 9 Drawing Sheets

(51) Int. Cl.
*H02M 7/757* (2006.01)
*H02M 7/483* (2007.01)

(56) References Cited

U.S. PATENT DOCUMENTS

| | | | |
|---|---|---|---|
| 6,480,403 | B1 | 11/2002 | Bijlenga |
| 7,960,871 | B2 | 6/2011 | Dommaschk et al. |
| 7,969,755 | B2 | 6/2011 | Davies et al. |
| 8,144,488 | B2 | 3/2012 | Petersson et al. |
| 8,144,489 | B2 | 3/2012 | Dommaschk et al. |
| 8,228,693 | B2 | 7/2012 | Petersson et al. |
| 8,233,300 | B2 | 7/2012 | Dommaschk et al. |
| 8,345,457 | B2 | 1/2013 | Asplund et al. |
| 8,410,883 | B2 | 4/2013 | Asplund et al. |
| 2005/0139259 | A1 | 6/2005 | Steigerwald et al. |
| 2006/0044857 | A1 | 3/2006 | Lemak |
| 2006/0056209 | A1* | 3/2006 | Blidberg ............... H02M 7/487 363/63 |
| 2008/0175028 | A1 | 7/2008 | Stefanutti et al. |
| 2008/0198637 | A1 | 8/2008 | Meysenc et al. |
| 2009/0146595 | A1* | 6/2009 | Immler ................ H02M 7/487 318/400.29 |
| 2009/0244936 | A1 | 10/2009 | Falk et al. |
| 2009/0262477 | A1* | 10/2009 | Dorn .................. H01H 85/0241 361/58 |
| 2009/0295225 | A1 | 12/2009 | Asplund et al. |
| 2010/0067266 | A1* | 3/2010 | Dommaschk ......... H02M 7/483 363/64 |
| 2011/0013438 | A1 | 1/2011 | Frisch et al. |
| 2011/0019453 | A1 | 1/2011 | Gonzalez Senosiain et al. |
| 2011/0096575 | A1 | 4/2011 | Asplund et al. |
| 2011/0115532 | A1 | 5/2011 | Roesner et al. |
| 2012/0206948 | A1 | 8/2012 | Maldini et al. |

FOREIGN PATENT DOCUMENTS

| | | |
|---|---|---|
| WO | 0231956 A1 | 4/2002 |
| WO | 02063758 A1 | 8/2002 |
| WO | 2004082115 A1 | 9/2004 |
| WO | 2011124258 A1 | 10/2011 |
| WO | 2012055435 A1 | 5/2012 |
| WO | 2013017353 A1 | 2/2013 |
| WO | 2013135277 A1 | 9/2013 |

OTHER PUBLICATIONS

Noman Ahmed et al.; HVDC SuperGrids with Modular Multilevel Converters—the Power Transmission Backbone of the Future; IEEE 9th International Multi-Conference on Systems, Signals and Devices; 2012; 7 Pages.

Silke Allebrod et al.; New Transformerless, Scalable Modular Multilevel Converters for HVDC-Transmission; IEEE; 2008; 6 Pages.

European Search Report issued in connection with corresponding EP Application No. 13184041.5-1809 on Nov. 26, 2014.

Friedrich, "Modern HVDC Plus Application of VSC in Modular Multilevel Converter Topology", Industrial Electronics (ISIE), IEEE International Symposium, pp. 3807-3810, Jul. 4-7, 2010.

Candelaria et al., "VSC-HVDC System Protection: A Review of Current Methods", Power Systems Conference and Exposition (PSCE), IEEE, pp. 1-7, Mar. 20-23, 2011.

Adam et al., "New Flying Capacitor Multilevel Converter", Industrial Electronics (ISIE), IEEE International Symposium, pp. 335-339, Jun. 27, 2011.

European Search Report and Opinion issued in connection with related EP Application No. 14177807.6 on Jun. 17, 2015.

\* cited by examiner

MULTILEVEL POWER CONVERTER SYSTEM AND METHOD

BACKGROUND

The invention relates generally to power converters and more specifically to a multilevel converter.

In the last few decades, the field of power conversion has grown tremendously due to its imminent advantages in motor drives, renewable energy systems, high voltage direct current (HVDC) systems, and the like. The multilevel converter is emerging as a promising power conversion technology for various medium and high voltage applications.

Multilevel converters offer several advantages over an ordinary two-level converter. For example, the power quality of the multilevel converter is better than that of two level converters. Also, the multilevel converters are ideal for interface between a grid and renewable energy sources such as photovoltaics (PV), fuel cells, wind turbines, and the like. In addition, the efficiency of the multilevel converter is relatively higher as a result of its minimum switching frequency.

In the recent times, the multilevel converters having a modular structure and without transformers have been designed. The modular structure of the converters, allows stacking of these converters to an almost unlimited number of levels. Also, the modular structure aids in scaling up to different power and voltage levels. However, certain currently available multilevel converters such as modular multilevel converters (MMC) typically employ a large number of fully controllable semiconductor switches, such as insulated gate bipolar transistors (IGBTs).

BRIEF DESCRIPTION

In accordance with aspects of the present disclosure, a power converter is presented. The power converter includes at least one leg. The at least one leg includes a first string including a plurality of controllable semiconductor switches, a first connecting node, and a second connecting node, where the first string is operatively coupled across a first bus and a second bus. Furthermore, the at least one leg includes a second string operatively coupled to the first string via the first connecting node and the second connecting node, where the second string includes a plurality of switching units.

In accordance with another aspect of the present disclosure, a method for power conversion is presented. The method includes coupling a first string to a second string to form a power converter, where the first string includes a plurality of controllable semiconductor switches and the second string includes a plurality of switching units. Also, the method includes generating a switching pattern for the plurality of controllable semiconductor switches and the plurality of switching units based on a first line parameter input at a first terminal of the power converter. Furthermore, the method includes selectively switching the plurality of controllable semiconductor switches and the plurality of switching units based on the generated switching pattern. The method also includes generating a second line parameter at a second terminal of the power converter based on the selective switching of the plurality of controllable semiconductor switches and the plurality of switching units.

In accordance with yet another aspect of the present disclosure, a system for power conversion is presented. The system includes a power source, a load, and a first power converter. The first power converter includes one or more legs, where each of the one or more legs includes a first string, where the first string includes a plurality of controllable semiconductor switches, a first connecting node, a second connecting node, and a third connecting node, and where the first string is operatively coupled across a first bus and a second bus. Also, each of the one or more legs includes a second string operatively coupled to the first string via the first connecting node and the second connecting node, where the second string includes a plurality of switching units. Furthermore, the system includes a controller configured to control switching of the plurality of controllable semiconductor switches and the plurality of switching units.

In accordance with yet another aspect of the present disclosure, a system for power conversion is presented. The system includes a power source, a load, and a first power converter. The first power converter includes one or more legs, where each of the one or more legs includes a first string operatively coupled between a first bus and a second bus, where the first string includes a plurality of controllable semiconductor switches, a first connecting node, a second connecting node, and a third connecting node, and where the third connecting nodes of the one or more legs are operatively coupled to each other. Also, each of the one or more legs includes a second string operatively coupled to the first string via the first connecting node and the second connecting node, where the second string includes a plurality of switching units. Furthermore, the system includes a controller configured to control switching of the plurality of controllable semiconductor switches and a plurality of switching units.

DRAWINGS

Figure 1:
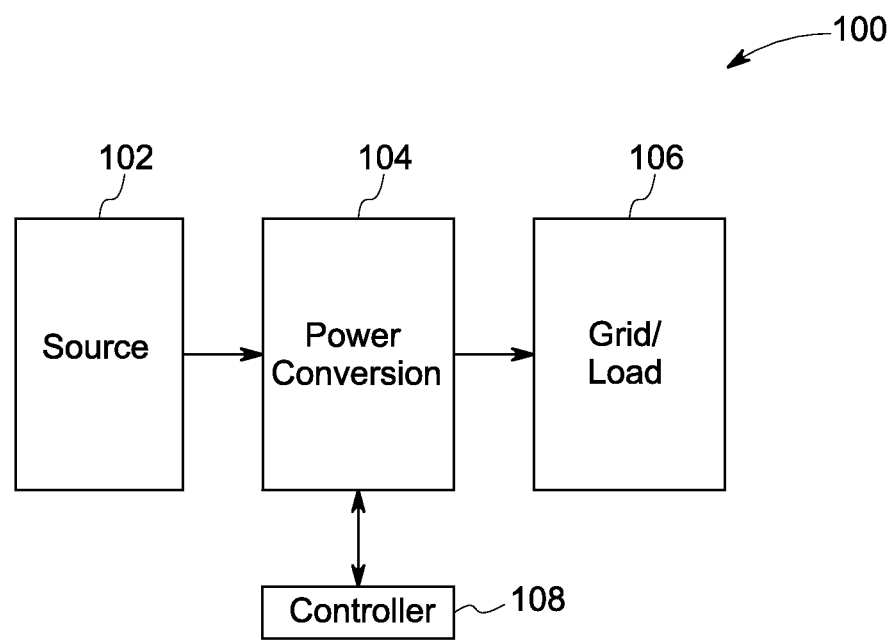
FIG. 1 is a diagrammatical representation of a system for power conversion.
Figure 3:
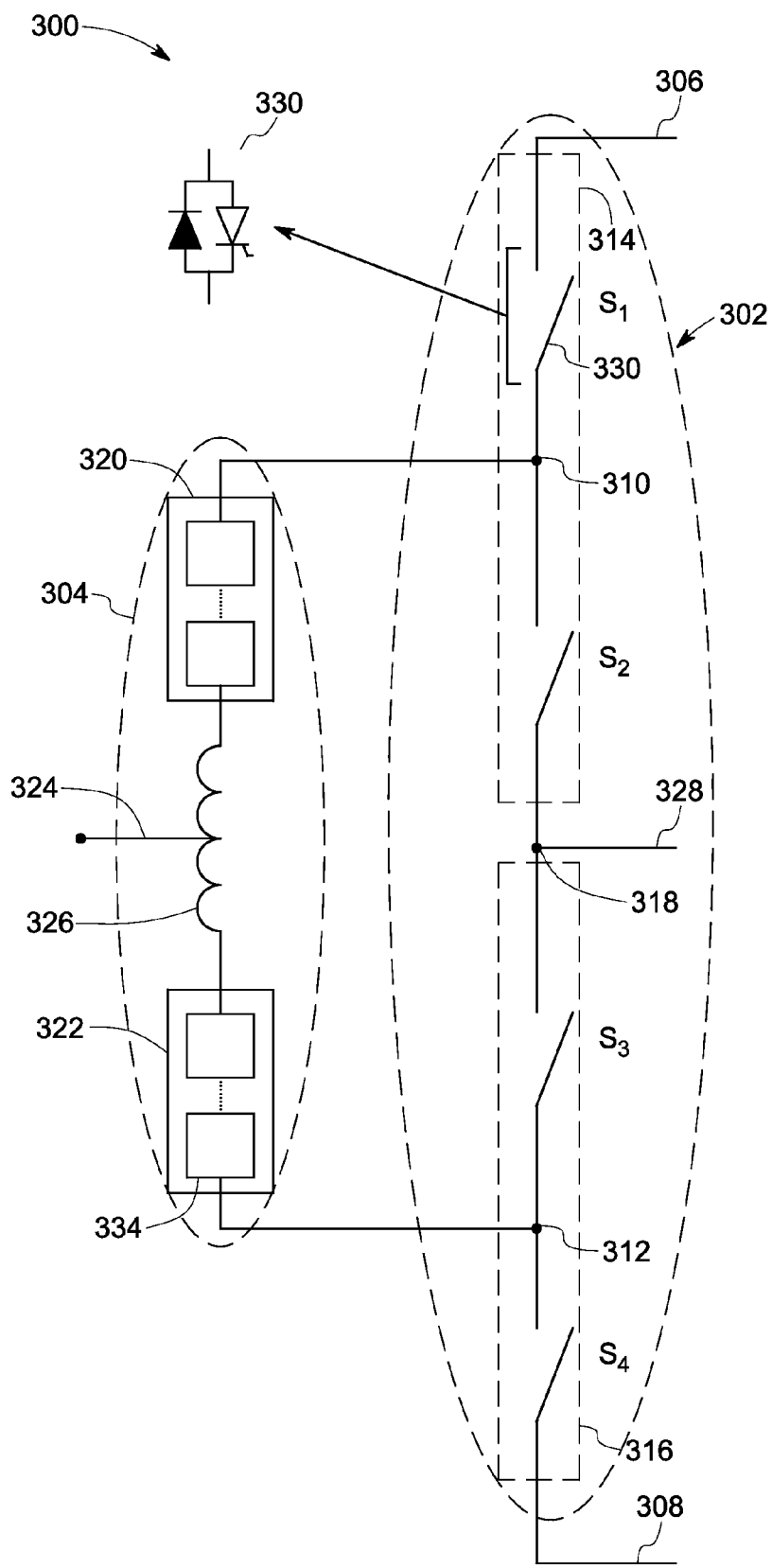
FIG. 3 is a diagrammatical representation of an exemplary embodiment of a portion of a power converter for use in the system of FIG. 1, according to aspects of the present disclosure.
Figure 5C:
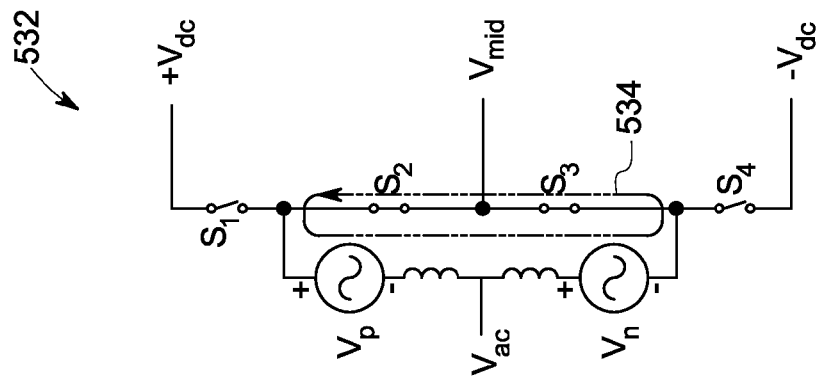
Figure 5B:
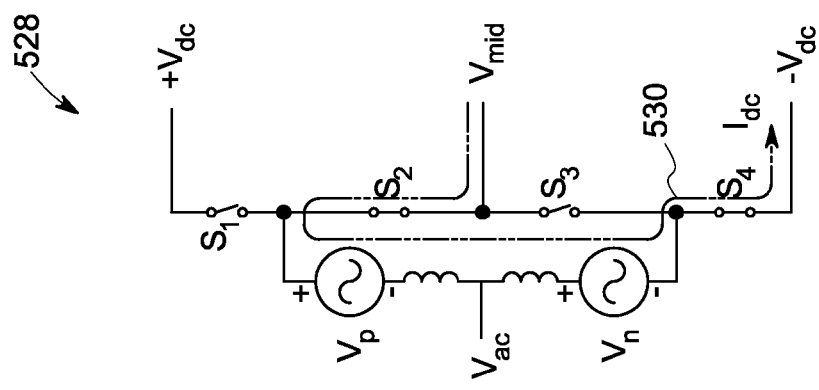
Figure 5A:
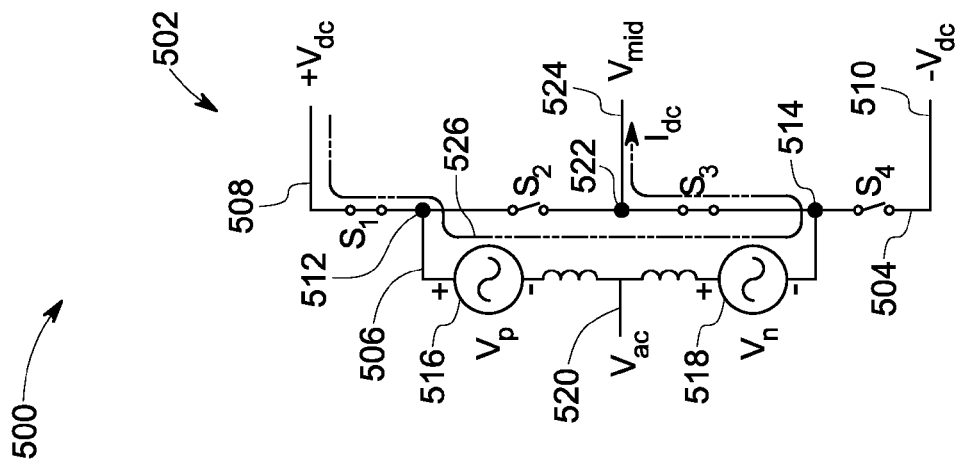
Figure 6:
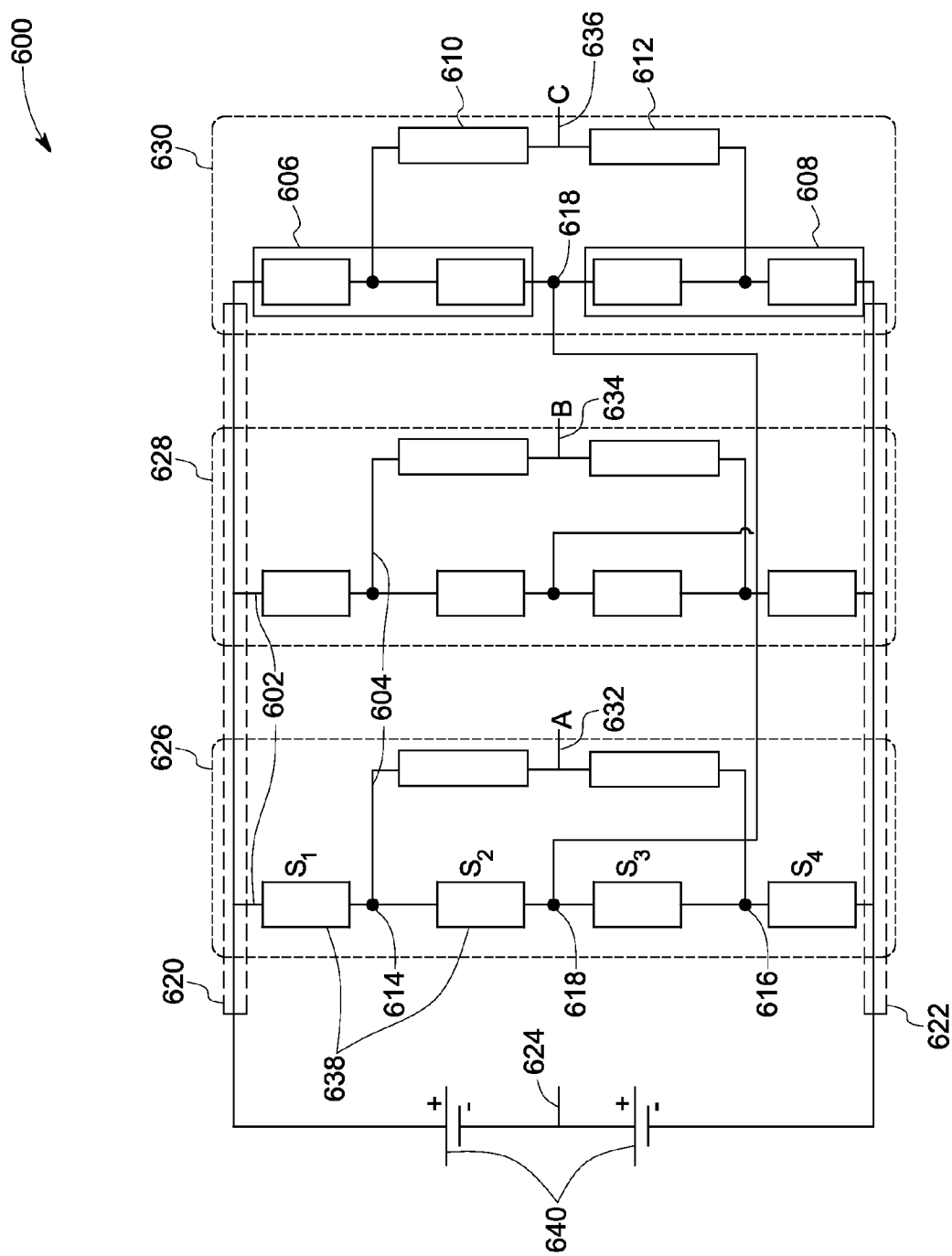
Figure 7:
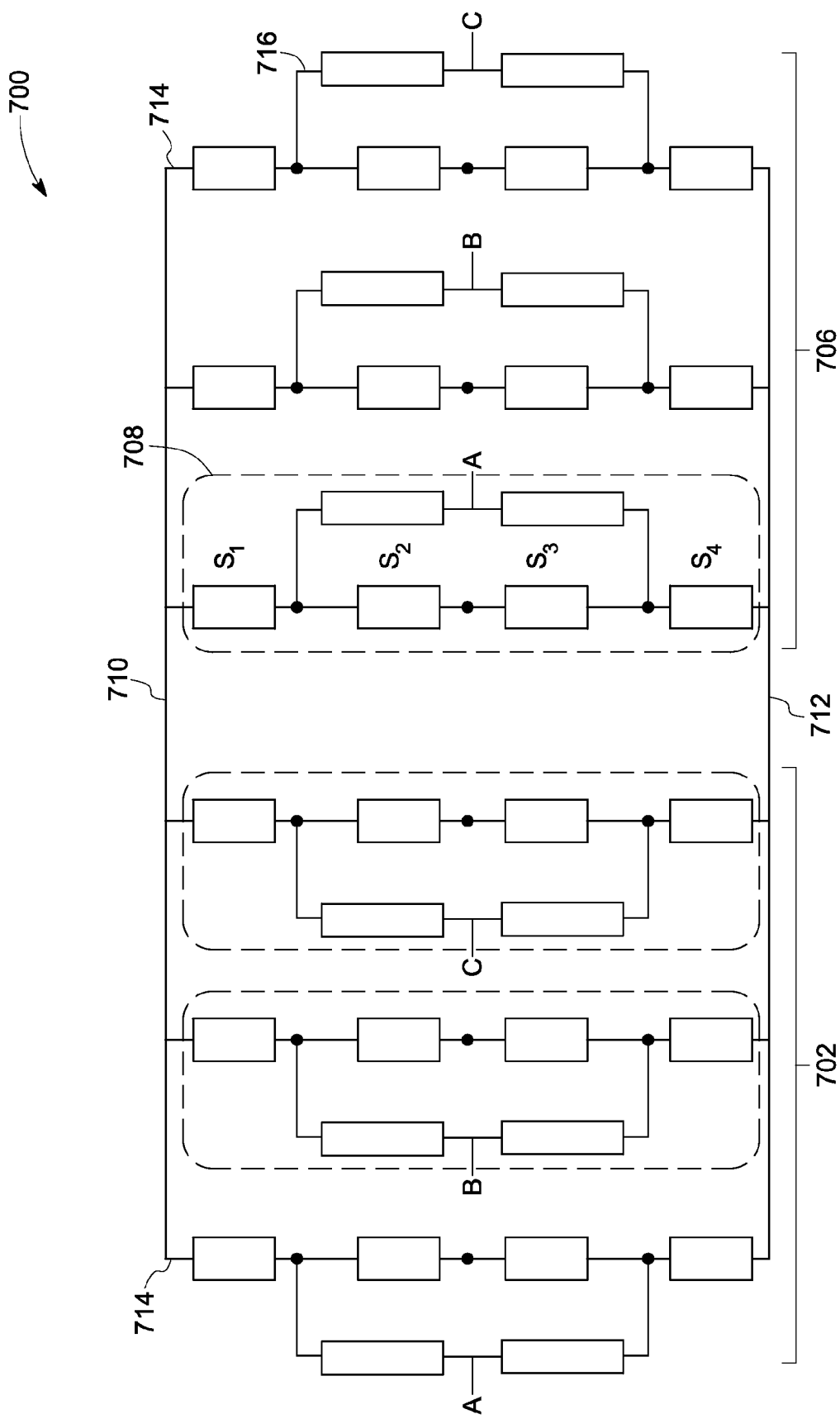
Figure 8:
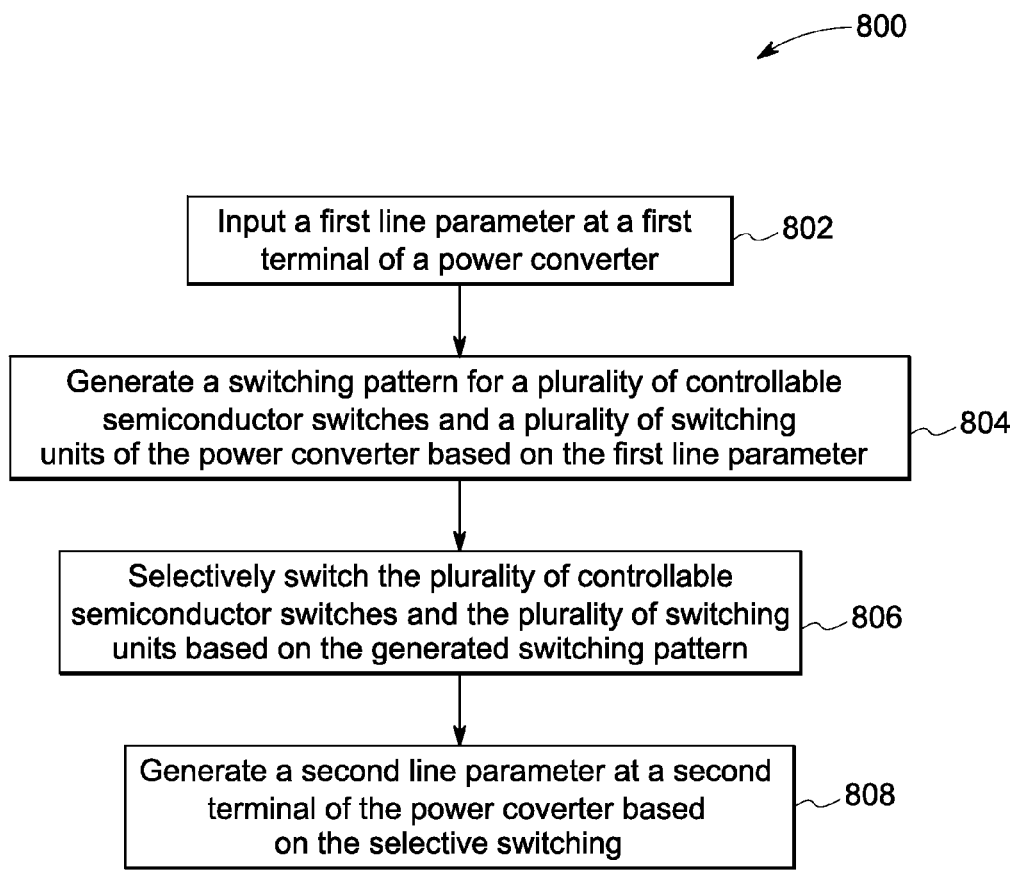
Figure 9:
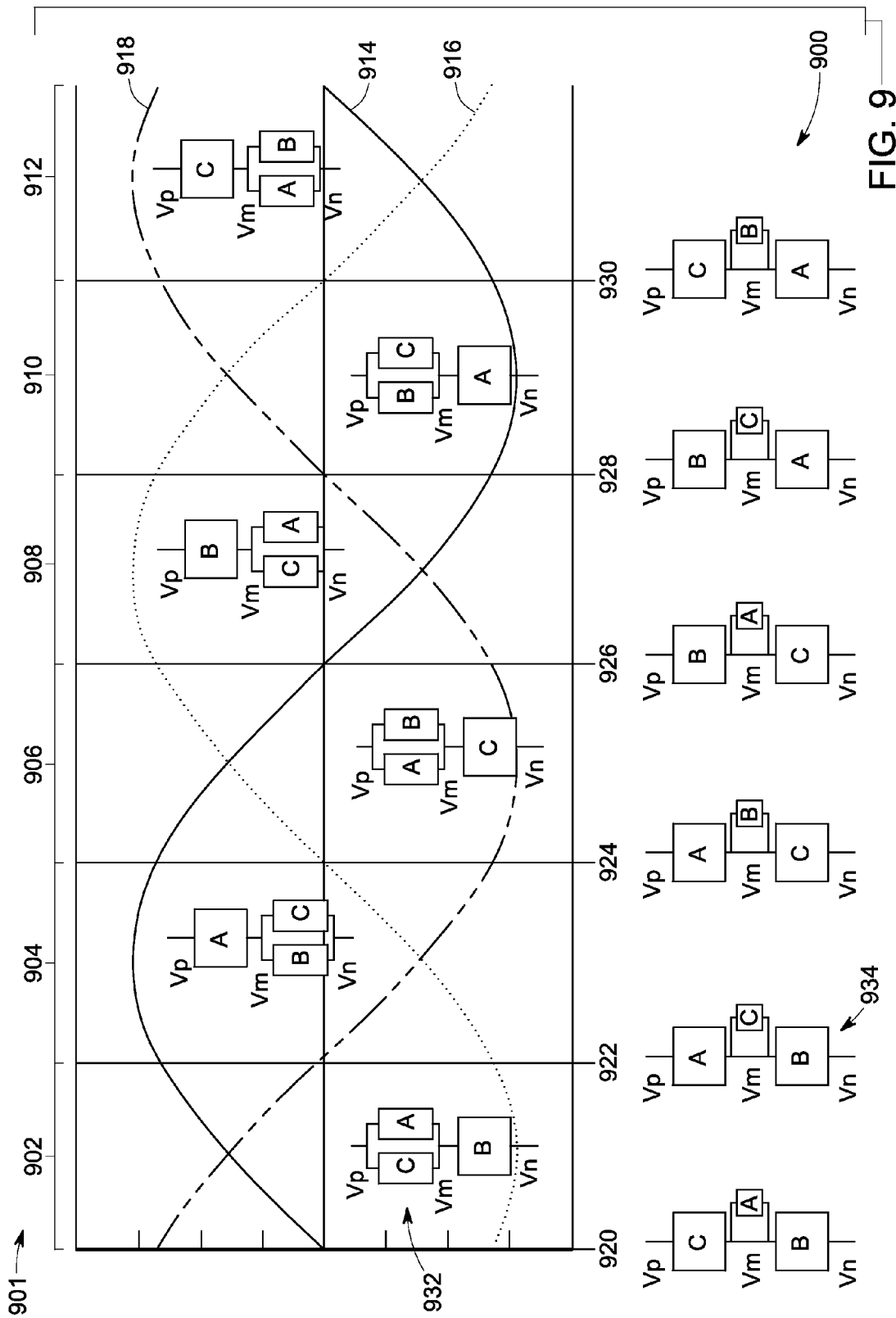

FIGS. 5(a)-5(c) are diagrammatical representations of an exemplary switching pattern of controllable semiconductor switches in the power converter of FIG. 3, according to aspects of the present disclosure;

FIG. 6 is a diagrammatical representation of an exemplary embodiment of a three phase power converter for use in the system of FIG. 1, according to aspects of the present disclosure;

FIG. 7 is a diagrammatical representation of an exemplary embodiment of a three phase back to back power converter for use in the system of FIG. 1, according to aspects of the present disclosure;

FIG. 8 is a flow chart representing an exemplary method for power conversion, according to aspects of the present disclosure; and FIG. 9 is a diagrammatical representation of voltage waveforms corresponding to different states of three phases in one line cycle, for use in the system of FIGS. 6 and 7.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of an exemplary system for power conversion and method for power conversion are presented. By employing the power converter and the method for power conversion described hereinafter, a multilevel converter is provided. In one example, the power converter may include a modular multilevel embedded converter. The term multilevel converter, as used herein, is used to refer to a converter that converts one form of input voltage/current to another form of output voltage/current with very low distortion.

Turning now to the drawings, by way of example in FIG. 1, a system 100 for converting power is depicted. In one embodiment, the system 100 for converting power may include a source 102, a power converter 104, and a grid/utility/load 106. The term source, as used herein, is used to refer to a renewable power source, a non-renewable power source, a generator, a grid, and the like. Also, the term load, as used herein, may be used to refer to a grid, an electrical appliance, and the like. In addition, the power converter 104 may be a multilevel converter. In one embodiment, the source 102 may be operatively coupled to a first terminal (not shown) of the power converter 104. A second terminal (not shown) of the power converter 104 may be operatively coupled to the load 106. The first terminal and the second terminal may be alternatively employed as an input terminal or an output terminal of the power converter 104. The term operatively coupled, as used herein, may include wired coupling, wireless coupling, electrical coupling, magnetic coupling, radio communication, software based communication, and the like.

Also, the system 100 may include a controller 108. The controller 108 may be configured to control the operation of the power converter 104, in one embodiment. By way of example, the controller 108 may be configured to control the operation of the power converter 104 by controlling switching of a plurality of semiconductor switches of the power converter 104. Furthermore, in one embodiment, the system 100 may also include other circuit components (not shown) such as, but not limited to, a transformer, a circuit breaker, an inductor, a compensator, a capacitor, a rectifier, a reactor, a filter, and the like. The power converter 104 will be explained in greater detail with respect to FIGS. 6 and 7.

Figure 2:
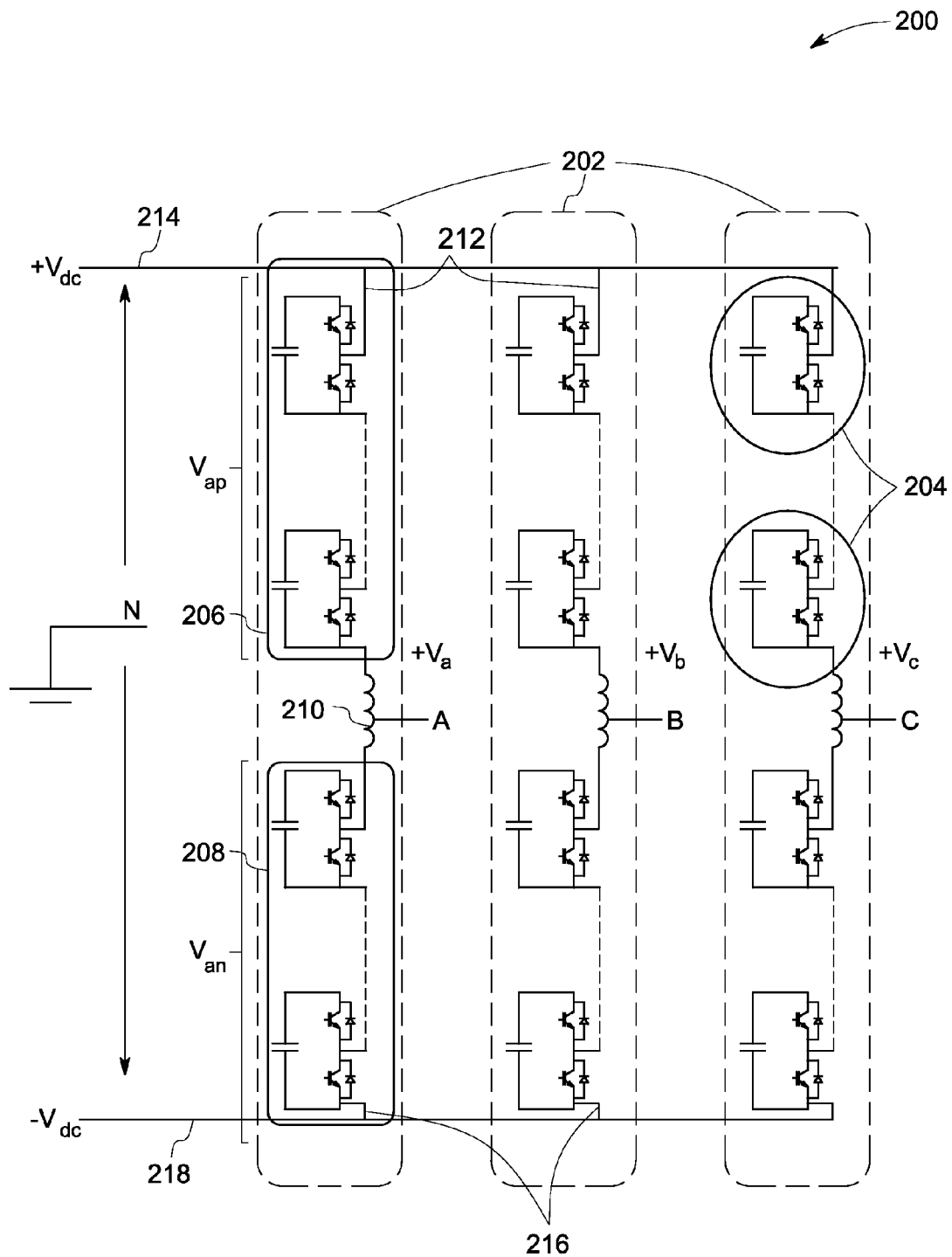
FIG. 2 is a diagrammatical representation of a conventional modular multilevel converter.

Referring now to FIG. 2, a diagrammatical representation of a conventional power converter 200 is depicted. In the example of FIG. 2, the power converter 200 is a modular multilevel converter having three branches 202. Furthermore, each branch 202 includes a first portion 206 operatively coupled to a second portion 208 via an inductor 210. The inductors 210 are operatively coupled to at least one alternating current (AC) phase (A, B, and C). Furthermore, the first portion 206 and the second portion 208 may include a plurality of switching units 204, where each switching unit includes a combination of two fully controllable semiconductor switches and an energy storage device such as a capacitor. The plurality of switching units 204 is connected in series to each other.

Moreover, a first end 212 of each of the three branches 202 is operatively coupled to a first bus 214, such as a positive direct current (DC) bus. Similarly, a second end 216 of each of the three branches 202 is operatively coupled to a second bus 218, such as a negative DC bus. A first terminal is formed by a combination of the first bus 214 and the second bus 218 and a second terminal is formed by a combination of the AC phases A, B and C.

Furthermore, the voltage at the first bus 214 is $+V_{dc}$ and the voltage at the second bus 218 is $-V_{dc}$, with respect to a virtual ground reference point N. Also, the voltage at the alternating current phases A, B, and C are represented by $V_a$, $V_b$, and $V_c$, respectively.

In the embodiment of FIG. 2, at any instant of time, the branch 202 is coupled between the first bus 214 and the second bus 218. Accordingly, the branch 202 may have to handle the full DC voltage ($2 V_{dc}$) appearing across the first bus 214 and the second bus 218. Also, for control of the power converter 200, the first portion 206 and the second portion 208 of the branch 202 may each have to withstand a maximum voltage of $2 V_{dc}$. Hence, a required number of switching units and/or a required rating of the switching units increase. By way of example, in FIG. 2, the rating of each of the switching units is $2 V_{dc}/N_1$, where $N_1$ is a number of switching units in each of the first and second portions 206, 208. Accordingly, the rating of each switching unit in the branch 202 is $4 V_{dc}/N$, where N is the number of switching units in the branch 202 and $N=2N_1$. If it is assumed that the voltage across each of the switching units 204 in the branch 202 is one volt, and if $V_{dc}$ is 8 volts then the voltage across the branch 202 is 16 volts, for example. Accordingly, the required number of switching units for each of the first and the second portions 206, 208 of the branch 202 is 16. Therefore, the total number of switching units for a given branch 202 is 32. Hence, for the switching units having a prescribed voltage rating, as the voltage across the first bus 214 and the second bus 218 is increased, the required number of switching units in the branch 202 also increases. This leads to a higher number of fully controllable semiconductor switches in the power converter, thereby increasing the cost and the complexity of the system. Furthermore, the increased voltage across the first bus 214 and the second bus 218 also increases the rating of the switching units 204 employed in the branch 202.

As noted hereinabove, the conventional modular multilevel converter (MMC) requires an increased number of switching units, thereby resulting in increased cost and complexity. In accordance with aspects of the present disclosure, a power converter that circumvents the shortcomings of the conventional MMC is presented.

Turning now to FIG. 3, a diagrammatical representation 300 of an exemplary embodiment of a portion of a power converter, such as the power converter 104 of FIG. 1, is depicted. In particular, a leg 300 of the power converter is depicted in the embodiment of FIG. 3. The leg 300 of the power converter may include a first string 302 and a second string 304. More particularly, the first string 302 may be operatively coupled to the second string 304 to form the leg 300. Furthermore, the first string 302 may be operatively coupled between a first bus 306 and a second bus 308. In one embodiment, the first bus 306 may include a positive DC bus and the second bus 308 may include a negative DC bus. The second string 304 may be operatively coupled to the first string 302 via a first connecting node 310 and a second connecting node 312. Also, the first string 302 may include a first branch 314 operatively coupled to a second branch 316 via a third connecting node 318. Similarly, the second string 304 may include a first portion 320 operatively coupled to a second portion 322 via an AC phase 324 and an inductor 326. The third connecting node 318 may be operatively coupled to a third bus 328.

Moreover, in the present example of FIG. 3, the third bus 328 may be direct current bus and more particularly, a middle or center DC bus which may be at a negative potential with respect to the first bus 306 and at a positive potential with respect to the second bus 308. Also, the first string 302 may include a plurality of controllable semiconductor switches $S_1$, $S_2$, $S_3$, and $S_4$ (330). In the example of FIG. 3, the plurality of controllable semiconductor switches may include partially controllable semiconductor switches. However, in another embodiment, the plurality of controllable semiconductor switches may include fully controllable semiconductor switches. Moreover, the plurality of controllable semiconductor switches may include a combination of partially controllable semiconductor switches and fully controllable semiconductor switches. By way of a non-limiting example, the first string 302 may include partially controllable semiconductor switches, fully controllable semiconductor switches, or a combination of partially controllable semiconductor switches and fully controllable semiconductor switches. Furthermore, in one example, the first branch 314 of the first string 302 may include two controllable semiconductor switches $S_1$ and $S_2$. Similarly, the second branch 316 of the first string 302 may include two controllable semiconductor switches $S_3$ and $S_4$. The controllable semiconductor switches $S_1$, $S_2$, $S_3$, and $S_4$ may include a power diode in combination with a thyristor, a silicon controlled rectifier, a gate turnoff thyristor, an IGBT, and the like.

In addition, the first portion 320 and the second portion 322 of the second string 304 may include a plurality of switching units 334. The switching unit 334 may be a combination of a plurality of fully controllable semiconductor switches and an energy storage device. The fully controllable semiconductor switches may include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof.

Furthermore, the leg 300 may be employed in a single phase power converter, a two phase power converter, a three phase power converter, and other equivalent multiphase power converters. The switching of the controllable semiconductor switches $S_1$, $S_2$, $S_3$ and $S_4$ will be explained in greater detail with reference to FIGS. 5(a)-5(c), 8 and 9.

Figure 4:
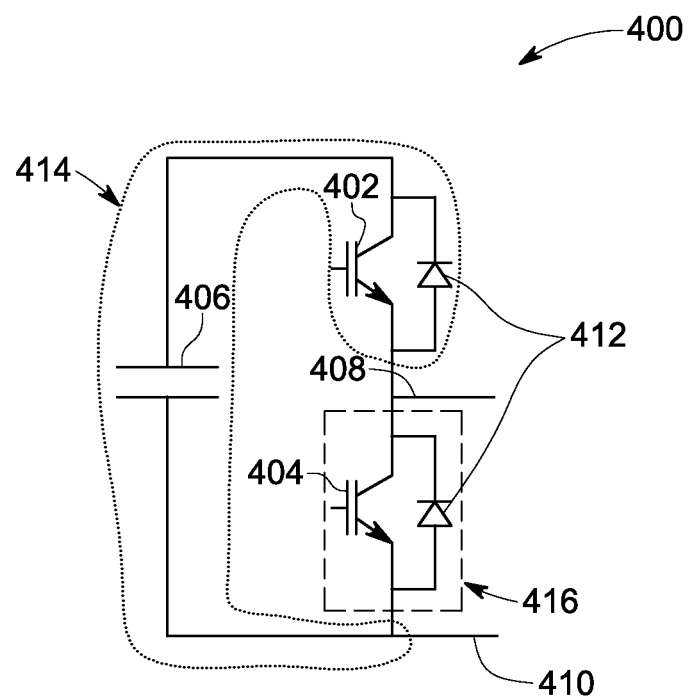
FIG. 4 is a diagrammatical representation of an exemplary embodiment of a switching unit for use in the portion of the power converter of FIG. 3, according to aspects of the present disclosure.

Referring now to FIG. 4, diagrammatical representation 400 of an exemplary embodiment of a switching unit such as the switching unit 334 of FIG. 3 for use in the leg 300 of FIG. 3, is depicted. In the presently contemplated configuration, the switching unit 400 may include fully controllable semiconductor switches 402 and 404, an energy storage device 406, a first connector 408, and a second connector 410. As previously noted, the fully controllable semiconductor switches 402, 404 may include an IGBT, a MOSFET, a FET, an IEGT, a gate turn-off thyristor, an IGCT, a silicon carbide based switch, a gallium nitride based switch, a gallium arsenide based switch, or equivalents thereof. Moreover, each of the fully controllable semiconductor switches 402, 404, may also include a power diode 412 that may be inbuilt and antiparallel to the fully controllable semiconductor switches 402 and 404. The inbuilt power diodes 412 may provide a freewheeling path. These power diodes 412 may also be referred to as freewheeling diodes.

Also, in one non-limiting example, the energy storage device 406 may include a capacitor. In the example of FIG. 4, the fully controllable semiconductor switch 402 may be operatively coupled in series to the energy storage device 406 to form a first limb 414. Also, the other fully controllable semiconductor switch 404 forms a second limb 416. The second limb 416 may be operatively coupled in parallel to the first limb 414. Additionally, the first limb 414 and the second limb 416 may be operatively coupled between the first connector 408 and the second connector 410. Although the example of FIG. 4 depicts the switching units 400 in a half bridge converter configuration as including two fully controllable semiconductor switches, and one energy storage device, use of other numbers of fully controllable semiconductor switches 402, 404, and energy storage devices 406 is also contemplated. In one embodiment, some or all of the switching units may be arranged to form a full bridge converter configuration.

Furthermore, in one non-limiting example, when the fully controllable semiconductor switch 402 is activated and the fully controllable semiconductor switch 404 is deactivated, the energy storage device 406 may appear across the first connector 408 and the second connector 410. Consequently, the charge across the energy storage device 406 appears as a voltage across the first connector 408 and the second connector 410. Alternatively, when the fully controllable semiconductor switch 404 is activated and the fully controllable semiconductor switch 402 is deactivated, the first limb 414 is bypassed, thereby providing zero voltage across the first connector 408 and the second connector 410. Hence, by controlling the switching of the fully controllable semiconductor switches 402 and 404 in the plurality of switching units 334 on the second string 304 of FIG. 3, the voltage developed across the second string 304 may be regulated.

Turning now to FIGS. 5(a)-5(c), diagrammatical representations 500 of different states of a leg of a power converter, such as the leg 300 of FIG. 3, according to the aspects of the present disclosure, are depicted. By way of example, the switching pattern of the controllable semiconductor switches 330 ($S_1$, $S_2$, $S_3$, and $S_4$) in the first string 302 of FIG. 3 is depicted.

Referring to FIG. 5(a), a diagrammatical representation of a leg 502, such as the leg 300 of FIG. 3, in a first state of switching of the controllable semiconductor switch is presented. The first state may also be referred to as a positive state. The leg 502 may include a first string 504 and a second string 506. Also, the leg 502 may be operatively coupled between a first bus 508 and a second bus 510. As noted hereinabove, the first bus 508 may include a positive DC bus and the second bus 510 may include a negative DC bus. Furthermore, the first string 504 may be operatively coupled to the second string 506 via a first connecting node 512 and a second connecting node 514.

In addition, a first portion, such as the first portion 320 of FIG. 3 of the second string 506 and a second portion, such as the second portion 322 of FIG. 3 of the second string 506 may be represented by voltage sources $V_p$ 516 and $V_n$ 518, respectively. As noted hereinabove, the second string 506 may include a plurality of switching units (not shown). The first portion of the second string 506 and the second portion of the second string 506 may be operatively coupled via an alternating current phase 520. Also, the first string 504 may include a third connecting node 522, which may be operatively coupled to a third bus 524. Also, in the presently contemplated configuration the first string 504 includes four controllable semiconductor switches represented as $S_1$, $S_2$, $S_3$ and $S_4$. Additionally, the voltage at the first bus 508 may be represented as $+V_{dc}$ and the voltage at the second bus 510 may be represented as $-V_{dc}$. By way of example, the voltage of $+V_{dc}$ at the first bus 508 and the voltage of $-V_{dc}$ at the second bus 510 may be with respect to a virtual ground. Also, the voltage at the third bus 524 may be represented as $V_{mid}$, and the voltage at the alternating current phase may be represented as $V_{ac}$.

As depicted in FIG. 5(*a*), during the first state of switching, the controllable semiconductor switches $S_1$ and $S_3$ are activated, while the controllable semiconductor switches $S_2$ and $S_4$ are maintained in a deactivated state. The activation of controllable semiconductor switches $S_1$ and $S_3$ provides a first current flow path 526 between the first bus 508 and the third bus 524 via a corresponding second string 506. Consequently, the second string 506 may be operatively coupled between the first bus 508 and the third bus 524 in the positive state. Furthermore, while the first current flow path 526 is established, the voltage across the first bus 508 and the third bus 524 may depend on the switching of the fully controllable semiconductor switches corresponding to the plurality of switching units in the second string 506, such as the switching units 334 of FIG. 3. The current flowing through the first current flow path 526 is represented as $I_{ds}$.

In a similar fashion, FIG. 5(*b*) is a diagrammatical representation 528 of a leg in a second state of switching of the controllable semiconductor switches. The second state of switching of the controllable semiconductor switches may also be referred to as a negative state. For ease of understanding, FIG. 5(*b*) is explained with reference to FIG. 5(*a*). In the second state, the controllable semiconductor switches $S_2$ and $S_4$ may be activated, while controllable semiconductor switches $S_1$ and $S_3$ are deactivated. The activation of the controllable semiconductor switches $S_2$ and $S_4$ may result in providing a second current flow path 530 between the third bus 524 and the second bus 510. Accordingly, the second string 506 may be operatively coupled between the second bus 510 and the third bus 524 in the negative state.

Similarly, FIG. 5(*c*) is a diagrammatical representation 532 of a leg in a third state of switching of the controllable semiconductor switches. The third state of switching of the controllable semiconductor switches may also be referred to as a zero state. For ease of understanding, FIG. 5(*c*) is explained with reference to FIG. 5(*a*). Furthermore, in the third state, the controllable semiconductor switches $S_2$ and $S_3$ may be activated, while the controllable semiconductor switches $S_1$, and $S_4$ are deactivated. The activation of the controllable semiconductor switches $S_2$ and $S_3$ may result in providing a third current flow path 534. Subsequently, the current flows in the third current flow path 534. This third current flow path 534 may also be referred to as a freewheeling path. In addition, both ends of the second string 506 may be operatively coupled to each other via the activated controllable semiconductor switches $S_2$ and $S_3$ and the third bus 524. Although, FIGS. 5(*a*)-5(*c*) represent the three states of switching with reference to a single leg, these three states of switching may be employed simultaneously for a plurality of legs in a two phase power converter, a three phase power converter, and the like.

It may be noted that in the conventional multilevel power converters such as the power converter 200 of FIG. 2, the branch 202 has to withstand a voltage of 2 $V_{dc}$. As depicted in FIGS. 5(*a*)-5(*c*) at any instant in time, the second string 506 is operatively coupled between the first bus 508 and third bus 524, between the third bus 524 and the second bus 510, or both ends of the second string 506 may be operatively coupled to a third bus 524. Hence, the second string 506 may have to withstand a maximum voltage of value $V_{dc}$. Accordingly, for effective control of the power converter, the first portion of the second string 506 and the second portion of the second string 506 may each have to withstand a maximum voltage of $V_{dc}$. Consequently, a desired number of switching units in the second string 506 may be reduced. In addition, the rating of the switching units of the second string 506 may also be reduced. Accordingly, the rating of each switching unit of the second string 506 may be only $V_{dc}/N_1$, where $N_1$ is the number of switching units in each of the first and second portions of the second string 506. Hence, the rating of each switching unit may be 2 $V_{dc}/N$, where N is the number of switching units in the second string 506 and $N=2N_1$. For ease of explanation, the voltage across each of the switching units such as switching units 334 of FIG. 3 in the second string 506 may be assumed to be 1V. Also, if $V_{dc}$ is 8 volts, the conventional power converter 200 entails use of 32 switching units in the branch 202 of FIG. 2. However, for the same value of $V_{dc}$, in the exemplary leg 502, the number of switching units in the second string 506 may at least be halved to 16. Consequently, the number of the fully controllable semiconductor switches may also be correspondingly reduced. Accordingly, the conduction and switching losses corresponding to the fully controllable semiconductor switches is also reduced by half.

Furthermore, the switching of the plurality of controllable semiconductor switches $S_1$, $S_2$, $S_3$, and $S_4$ of the first string 504 may operate in combination with the switching of the plurality of switching units (not shown) in the second string 506. Also, as previously noted, the switching of the plurality of switching units in the second string 506 may include activation and/or deactivation of the fully controllable semiconductor switches.

Referring to FIG. 6, a diagrammatical representation 600 of an exemplary embodiment of a three phase multilevel converter, according to aspects of the present disclosure, is depicted. In the example of FIG. 6, the power converter 600 is a three phase modular multilevel embedded converter. In a presently contemplated configuration, the three phase multilevel converter 600 includes three legs 626, 628, 630. Each leg may include a respective first and second string 602, 604.

Furthermore, the first string 602 includes a first branch 606 and a second branch 608. Also, one end of the second string 604 may be operatively coupled to a first connecting node 614 of a respective first string 602, and the other end of the second string 604 may be operatively coupled to a second connecting node 616 of the same first string 602. In particular, one end of a first portion 610 of the second string 604 may be operatively coupled to the first string 602 via the first connecting node 614. The first connecting node 614 may be situated between two controllable semiconductor switches 638 ($S_1$ and $S_2$) of the first branch 606 of the first string 602. In addition, one end of a second portion 612 of the second string 604 may be operatively coupled to the first string 602 via the second connecting node 616. Further, the second connecting node 616 may be situated between two controllable semiconductor switches 638 ($S_3$ and $S_4$) of the second branch 608 of the first string 602.

The first portion 610 of the second string 604 may be operatively coupled to the second portion 612 of the second string 604 via a fourth bus. The term fourth bus, as used herein, may be an alternating current (AC) phase. In particular, each of the three legs 626, 628, 630 may be associated with at least one AC phase. In a non-limiting example, a three phase AC system may include an AC phase-A 632, an AC phase-B 634, and an AC phase-C 636. Additionally, a first terminal (not shown) may be formed by a combination of a first bus 620 and a second bus 622. The first terminal may also be referred to as a DC terminal. Also, the AC phases, AC phase-A 632, AC phase-B 634, and AC phase-C 636 in combination may form a second terminal (not shown). The second terminal may also be referred to as an AC terminal. In the example of FIG. 6, two DC voltage sources 640 may be operatively coupled between the first bus 620 and the second bus 622. However, in one example, the use of other number of DC voltage sources is contemplated.

In addition, the first branch 606 may be operatively coupled to the second branch 608 via a third connecting node 618. In one embodiment, the third connecting node 618 may be the middle point of the first string 602. Furthermore, in one example, the third connecting nodes 618 of each of the three first strings 602 may be operatively coupled to each other to form a floating point. In another embodiment, the third connecting nodes 618 of each of the three first strings 602 may be operatively coupled to a third bus 624. As noted hereinabove, the third bus 624 may be a middle or center DC bus. However, in another embodiment, for applications in machine drives, the third connecting nodes 618 of each of the three first strings 602 may be operatively coupled to a neutral bus. Moreover, the three legs 626, 628, 630 may be operatively coupled between the first bus 620 and the second bus 622.

Furthermore, the power converter 600 may be operatively coupled to a controller such as the controller 108 of FIG. 1. As previously noted, the first strings 602 may include a plurality of controllable semiconductor switches, while the second strings 604 may include a plurality of switching units. The controller may be configured to control the switching of the plurality of controllable semiconductor switches in the first strings 602 and the plurality of switching units in the second strings 604. In one example, the switching of the switching units in the second strings 604 and that of the controllable semiconductor switches in the first strings 602 may be based on a modulation technique. The modulation technique may include pulse width modulation technique, space vector modulation, and the like. Moreover, the controller may be configured to aid in the generation of a sinusoidal voltage at the alternating current phases 632, 634, 636 with respect to the third bus 624. Also, the controller may be configured to balance and regulate energy stored in the second string 604 during a line cycle. Accordingly, the controller may be configured to ensure that an average power of a second string 604 during one line cycle is zero. The term line cycle, as used herein, may be an AC voltage cycle. In addition, the controller may also be configured to regulate currents in the first string 602 and the second string 604 to maintain the voltage at the third connecting node 618 at a value that is substantially equal to the voltage at the third bus 624. In one embodiment, the controller may be disposed at a remote location.

The use of only partially controllable semiconductor switches in the first strings 602 of the power converter 600 aids in reducing the number of fully controllable semiconductor switches employed for generating a desired output voltage/current. Therefore, a relatively simpler and less expensive power converter may be obtained.

Turning now to FIG. 7, a diagrammatical representation 700 of a back-to-back mode three phase power converter is depicted. The back to back mode three phase power converter 700 may include a first converter 702 operatively coupled to a second converter 706. In one embodiment, the first converter 702 and the second converter 706 may have a topology that is substantially similar to the topology of the power converter 600 of FIG. 6. The first converter 702 and the second converter 706 may each include three legs 708. Also, the first converter 702 and the second converter 706 may be operatively coupled via a first bus 710 and a second bus 712. However, in another embodiment, the first bus 710 and the second bus 712 may be replaced by a high voltage direct current (HVDC) transmission line. Each of the legs 708 may include a first string 714 operatively coupled to a second string 716. Also, the first string 714 such as the first string 302 of FIG. 3, may include a plurality of controllable semiconductor switches and the second string 716, such as the second string 304 of FIG. 3, may include a plurality of switching units. The power converter 700 may be employed to facilitate transfer of power in one direction or in both directions. Furthermore, the power converter 700 may be used to connect and transfer power between two alternating current grids of different frequencies. In this example, it may be desirable to provide isolation between the two alternating current grids.

Referring now to FIG. 8, a flow chart 800 representing an exemplary method for power conversion, according to aspects of the present disclosure, is depicted. For ease of understanding, the method of FIG. 8 will be described with respect to FIG. 6. The method begins at step 802, where a first line parameter may be input at a first terminal of the power converter 600. The first line parameter may include a DC voltage, a DC current, an AC voltage, an AC current, or equivalents thereof. In one non-limiting example, a DC voltage may be input at the first terminal and an AC voltage may be obtained as an output at a second terminal of the power converter 600. As previously noted, the AC phases, AC phase-A 632, AC phase-B 634, and AC phase-C 636 in combination may form the second terminal of the power converter 600. It may be noted that the first terminal and the second terminal may be used alternatively as an input terminal and an output terminal. In one example, the DC terminal may be the input terminal and the AC terminal may be the output terminal. However, in another example, the AC terminal may be the input terminal and the DC terminal may be the output terminal.

Furthermore, at step 804, a switching pattern corresponding to the plurality of controllable semiconductor switches such as $S_1$, $S_2$, $S_3$, and $S_4$ of FIG. 6 and the plurality of fully controllable semiconductor switches of the switching units such as the switching units 334 of FIG. 3 may be generated based on the first line parameter input at the first terminal. The term switching pattern, as used herein, may be representative of a manner in which the plurality of controllable semiconductor switches $S_1$, $S_2$, $S_3$, and $S_4$ and the plurality of fully controllable semiconductor switches of the switching units may be activated and/or deactivated. It may be noted that the switching patterns corresponding to the plurality of controllable semiconductor switches $S_1$, $S_2$, $S_3$, and $S_4$ and the plurality of fully controllable semiconductor switches of the switching units 334 may vary based on the first line parameter. Furthermore, in one example, the switching pattern corresponding to the plurality of controllable semiconductor switches $S_1$, $S_2$, $S_3$, and $S_4$ and the plurality of fully controllable semiconductor switches of the switching units 334 may also depend on a desired output to be generated.

Also, at step 806, the plurality of controllable semiconductor switches $S_1$, $S_2$, $S_3$, and $S_4$ in the first string 602 and the plurality of switching units in the second string 604 may be selectively switched based on the switching pattern generated at step 804. The term switching, as used herein, may include activation and/or deactivation of the plurality of controllable semiconductor switches $S_1$, $S_2$, $S_3$, and $S_4$ in the first string 602. In a similar fashion, the switching of the plurality of switching units in the second string 604 may include activation and/or deactivation of the fully controllable semiconductor switches in the switching units.

Moreover, at step 808, a second line parameter may be generated at the second terminal of the power converter 600 based on selective switching of step 806. The second line parameter may include a DC voltage, an AC voltage and the like, in one example. Furthermore, the switching of the controllable semiconductor switches during a zero state, a positive state, and a negative state of the legs, such as the legs 626, 628, 630 of FIG. 6, aid in the generation of the second line parameter which is representative of an output of the modular multilevel embedded converter 600 of FIG. 6.

Referring to FIG. 9, a diagrammatical representation 900 of voltage waveforms corresponding to the different states of three AC phases (see FIG. 6) in one line cycle 901, according to the aspects of the present disclosure, is depicted. For ease of understanding, FIG. 9 will be described with respect to FIGS. 5(a)-5(c), 6 and 8. In a presently contemplated configuration, the line cycle 901 may be partitioned into six sections 902, 904, 906, 908, 910, 912. Also, the three AC phases may include the AC-phase A 632, the AC phase-B 634, and the AC phase-C 636. In the example of FIG. 9, voltage waveforms corresponding to the AC three phases A, B, and C are presented. The voltage waveforms corresponding to the three phases may include a first voltage waveform 914 corresponding to AC phase-A, a second voltage waveform 916 corresponding to AC phase-B, and a third voltage waveform 918 corresponding to AC phase-C.

Also, the six sections 902, 904, 906, 908, 910, and 912 may have corresponding switching patterns to generate desired outputs. As noted hereinabove, the switching pattern may be determined at step 804 of FIG. 8. During a portion of the line cycle 901 corresponding to each section, that section may have one or two legs in a positive state and other legs in a negative state. Furthermore, the line cycle 901 of the three AC phases may include six transient zones 920, 922, 924, 926, 928, and 930. The term transient zone, as used herein, is used to refer to a zone during which at least one of the legs 626, 628, 630 transitions from one state to another. In one non-limiting example, at the transient zone 922, the state of the leg 630 associated with AC phase C changes from a positive state to a negative state.

Furthermore, during a transition between two adjacent sections, one of the legs may be in the positive state, while another leg may be in the negative state, and yet another leg may be in the zero state. In particular, in the section 902, the leg 626 associated with AC phase A and the leg 630 associated with AC phase C may be in the positive state, while the leg 628 associated with AC phase B may be in the negative state. Also, the leg 626 associated with AC phase A and the leg 630 associated with AC phase C may be operatively coupled in parallel to each other between the first bus 620 and the third bus 624. Particularly, the second string 604 associated with the AC phase-A and the second string 604 associated with the AC phase-C may be operatively coupled in parallel to each other between the first bus 620 and the third bus 624 through the activated switches $S_1$ and $S_3$ of the corresponding first strings 602. Moreover, the leg 628 associated with AC phase B may be operatively coupled between the third bus 624 and the second bus 622. In particular, the switches $S_2$ and $S_4$ corresponding to the first string 602 associated with AC phase B may be activated. Accordingly, the leg 626 associated with AC phase A and the leg 630 associated with AC phase C may be operatively coupled in parallel to each other and further operatively coupled in series to the leg 628 associated with AC phase B, as indicated by reference numeral 932.

With continuing reference to FIG. 9, the section 902 is followed by the transient zone 922. At the transient zone 922, the leg 626 associated with AC phase A continues to be in the positive state and the leg 628 associated with AC phase B continues to be in negative state. However, the leg 630 associated with AC phase C transitions from the positive state to the zero state, as indicated by reference numeral 934. The switches $S_2$ and $S_3$ of the first string 602 associated with AC phase C may be activated. Consequently, when the leg 630 associated with AC phase C is in the zero state, both ends of the leg 630 may be operatively coupled to the third bus 624.

Prior to the transient zone 922, the leg 630 associated with AC phase C is in a positive state in the section 902. Hence, at the transient zone 922, the switch $S_1$ corresponding to the first string 602 associated with AC-phase C may be deactivated and the switch $S_2$ corresponding to the first string 602 associated with AC-phase C may be activated. Switch $S_2$ may be activated by applying a gate trigger signal. Also, at section 902, as previously noted, the leg 626 associated with AC phase A and the leg 630 associated with AC phase C may be operatively coupled in parallel to each other between the first bus 620 and the third bus 624 through the corresponding activated switches $S_1$ and $S_3$. Therefore, the DC current on the first bus 620 is shared by the leg 626 associated with AC phase A and the leg 630 associated with AC phase C. Accordingly, the DC current on the first bus 620 is shared by the switches $S_1$ and $S_3$ of the first string 602 associated with AC phase A and the switches $S_1$ and $S_3$ of the first string 602 associated with AC phase C. The deactivation of switch $S_1$ corresponding to first string 602 associated with AC phase C may be achieved by reducing the current to a near zero value in the first string 602 associated with AC phase C. Furthermore, the reduction of the current to the near zero value in the first string 602 associated with AC phase C may be achieved by employing a controller such as the controller 108 of FIG. 1.

Similarly, the switching of the controllable semiconductor switches in the first strings 602 corresponding to the legs 626, 628, 630 may be performed for sections 904, 906, 908, 910, and 912 and for the transient zones 924, 926, 928, 930, and 920 to obtain the desired output line parameter. As previously noted, in one embodiment, the switching of the controllable semiconductor switches in the first strings corresponding to the AC phase-A, the AC phase-B, and the AC phase-C may be controlled by the controller.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

The various embodiments of the power converter and the methods of power conversion described hereinabove aid in developing multilevel power converters, thereby allowing generation of high power/voltage/current output. Furthermore, since the exemplary power converter utilizes about half number of switching units when compared to a conventional modular power converter, a system of lower cost may be provided. Also, use of thyristors in the power converter provides a less expensive system. Furthermore, use of the thyristors provides a power converter with substantially lower losses. In addition, the exemplary power converter may circumvent the need for additional capacitors in the DC link. The various embodiments of the power converter may find application in solar, wind, and other renewable power generation devices. Also, the power converter may be employed in non-renewable power generation systems like thermal power plants, hydroelectric power plants, and equivalents thereof. In addition, the power converter may be employed as a DC-AC converter or an AC-DC converter for use in HVDC transmission and distribution systems.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. A power converter, comprising:
at least two legs, wherein each leg comprises:
a first string comprising a plurality of controllable semiconductor switches, a first connecting node, a second connecting node, and a third connecting node, wherein the first string is operatively coupled across a first bus and a second bus;
a second string operatively coupled to the first string via the first connecting node and the second connecting node, wherein the second string comprises:
a first portion; and
a second portion operatively coupled to the first portion via an inductor, wherein each of the first and second portions comprises a plurality of switching units having a plurality of fully controllable semiconductor switches and at least one energy storage device,
wherein the third connecting node of one leg of the at least two legs is operatively coupled to the third connecting node of the other leg to form a floating point, and wherein the third connecting nodes are not coupled to the first bus, the second bus, and a third bus of the power converter.

2. The power converter of claim 1, wherein at least one of the plurality of fully controllable switches of the plurality of switching units is coupled in series with the at least one energy storage device to form a first limb, and the other fully controllable switches of the plurality of switching units form a second limb, and wherein the first limb is coupled in parallel with the second limb.

3. The power converter of claim 1, wherein the plurality of fully controllable semiconductor switches comprises an insulated gate bipolar transistor, a metal oxide semiconductor field effect transistor, a field effect transistor, a gate turn-off thyristor, an insulated gate commutated thyristor, an injection enhanced gate transistor, a silicon carbide based switch, a gallium nitride based switch, a gallium arsenide based switch, or combinations thereof.

4. The power converter of claim 1, wherein the first bus comprises a positive direct current bus and the second bus comprises a negative direct current bus.

5. The power converter of claim 1, wherein the first string of each of the at least two legs comprises a first branch and a second branch, and wherein the second branch of the first string is operatively coupled to a corresponding first branch via a corresponding third connecting node.

6. The power converter of claim 1, wherein the plurality of controllable semiconductor switches comprises partially controllable semiconductor switches, fully controllable semiconductor switches, or a combination thereof.

7. The power converter of claim 1, wherein the third bus comprises a direct current bus.

8. The power converter of claim 1, wherein the first and second portions of the second string are operatively coupled to a fourth bus.

9. The power converter of claim 8, wherein the fourth bus comprises an alternating current phase.

10. A method for power conversion, comprising:
coupling a first string of each of at least two legs to a second string of each of the at least two legs to form a power converter, wherein the first string comprises a plurality of controllable semiconductor switches, a first connecting node, a second connecting node, and a third connecting node, and wherein the second string comprises:
a first portion;
a second portion operatively coupled to the first portion via an inductor, wherein each of the first and second portions comprises a plurality of switching units having a plurality of fully controllable semiconductor switches and at least one energy storage device;
coupling the third connecting node of one leg of the at least two legs to the third connecting node of the other leg to form a floating point such that the third connecting nodes are not coupled to a first bus, a second bus, and a third bus of the power converter;
generating a switching pattern for the plurality of controllable semiconductor switches and the plurality of switching units based on a first line parameter input at a first terminal of the power converter;
selectively switching the plurality of controllable semiconductor switches and the plurality of switching units based on the generated switching pattern; and
generating a second line parameter at a second terminal of the power converter based on the selective switching of the plurality of controllable semiconductor switches and the plurality of switching units.

11. The method of claim 10, wherein generating the second line parameter at the second terminal of the power converter comprises generating a sinusoidal voltage with reference to the third bus.

12. The method of claim 10, wherein selectively switching the plurality of controllable semiconductor switches comprises operatively coupling both ends of the second string to form a freewheeling path.

13. The method of claim 10, wherein the first line parameter and the second line parameter comprise an alternating current voltage, a direct current voltage, or a combination thereof.

14. The method of claim 10, wherein selectively switching the plurality of controllable semiconductor switches comprises operatively coupling the second string between the first bus and the third bus.

15. The method of claim 10, wherein selectively switching the plurality of controllable semiconductor switches comprises operatively coupling the second string between the second bus and the third bus.

16. A system for power conversion, comprising:
a power source;
a load;
a first power converter, comprising:
two or more legs, wherein each of the two or more legs comprises:
a first string comprising a plurality of controllable semiconductor switches, a first connecting node, a second connecting node, and a third connecting node, wherein the first string is operatively coupled across a first bus and a second bus, wherein the third connecting node of one leg of the two or more legs is operatively coupled to the third connecting node of the other leg to form a floating point, and wherein the third connecting nodes are not coupled to the first bus, the second bus, and a third bus;
a second string operatively coupled to the first string via the first connecting node and the second connecting node, wherein the second string comprises:
a first portion;
a second portion operatively coupled to the first portion via an inductor, wherein each of the first and second portions comprises a plurality of switching units having a plurality of fully controllable semiconductor switches and at least one energy storage device; and
a controller configured to control switching of the plurality of controllable semiconductor switches and the plurality of switching units.

17. The system of claim 16, wherein the plurality of switching units comprises a half bridge converter, a full bridge converter, or a combination thereof.

18. The system of claim 16, wherein the controller is further configured to regulate energy stored in the second string during a line cycle.

19. The system of claim 16, wherein the load comprises a grid, an electrical appliance, or a combination thereof.

20. The system of claim 16, further comprising a second power converter operatively coupled to the first power converter in a back to back power converter configuration.

21. A system for power conversion, comprising:
a power source;
a load;
a first power converter, comprising:
two or more legs, wherein each of the two or more legs comprises:
a first string operatively coupled between a first bus and a second bus, wherein the first string comprises a plurality of controllable semiconductor switches, a first connecting node, a second connecting node, and a third connecting node, wherein the third connecting nodes of each of the two or more legs are operatively coupled to each other to form a floating point, and wherein the third connecting nodes are not coupled to the first bus, the second bus, and a third bus;
a second string operatively coupled to the first string via the first connecting node and the second connecting node, wherein the second string comprises:
a first portion;
a second portion operatively coupled to the first portion via an inductor, wherein each of the first and second portions comprises a plurality of switching units having a plurality of fully controllable semiconductor switches and at least one energy storage device; and
a controller configured to control switching of the plurality of controllable semiconductor switches and a plurality of switching units.

* * * * *